March 26, 1929. N. R. KRAUSE 1,706,617
COMBINATION HARVESTER THRASHER
Filed Feb. 17, 1925
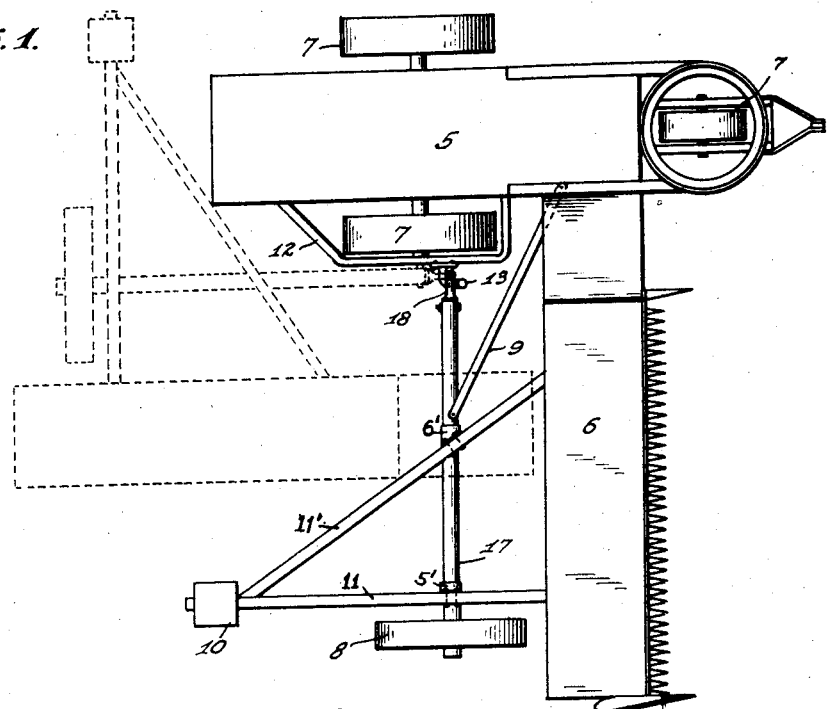
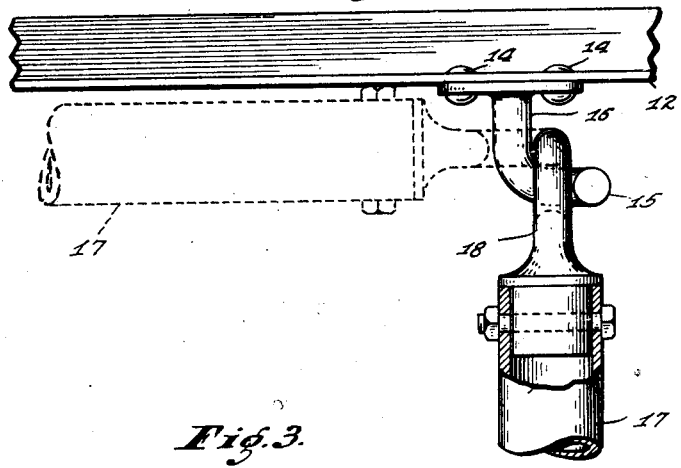
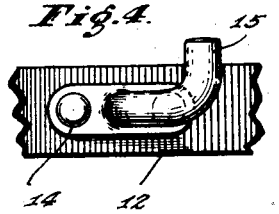
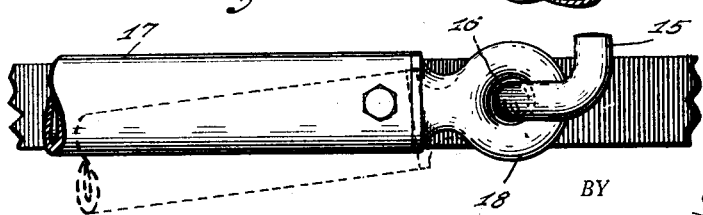
INVENTOR.
NORMAN R. KRAUSE,
BY James A. Walsh
ATTORNEY.

Patented Mar. 26, 1929.

1,706,617

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed February 17, 1925. Serial No. 9,896.

My invention relates to improvements in combination harvester-thrashers, and particularly to means for flexibly and detachably connecting the harvester to the thrasher to permit the vertical oscillation of the harvester during cutting operations and folding thereof alongside the thrasher to decrease the width of the machine for transportation and storage, the counterbalancing mechanism of said harvester being so mounted thereon as to become positioned transversely in respect to the rear of the thrasher when the harvester has been folded.

In the accompanying drawing, forming part hereof, Figure 1 is a plan of a combination harvester-thrasher embodying my improvement; Fig. 2 an enlarged plan of the coupling which I employ showing one of its members in dotted lines when the harvester is folded alongside the thrasher; Fig. 3 a side elevation of the parts shown in Fig. 2, and Fig. 4 an elevation showing the hook forming part of my improved coupling.

In said drawing the portions marked 5 and 6 indicate the thrasher and harvester, respectively, embodying the usual carrying wheels, 7, 8, a brace-rod, 9, for maintaining the harvester at right angles to the thrasher, a counterbalancing weight, 10, and other details of construction employed in machines of this type. The counterbalancing weight 10 is connected to the harvester 6 by an arm, 11, and a diagonal brace, 11', which are fulcrumed on the harvester axle so that the weight 10 will balance said harvester in its vertical adjustments in a well known manner, said arm and brace being connected to the non-rotatable axle, 17, by the loosely mounted collars, 5' and 6', to permit rocking motion of the harvester and counterbalance as the harvester is being so adjusted.

To the frame, as 12, of the thrasher I secure an open or L-shaped hook, 13, which may be attached by rivets, 14, or otherwise, and having its arm, 15, extending upwardly at right angles to its shank, 16. To said axle 17 or other portion of the harvester I secure an eye, 18, adapted to be engaged by said hook and prevented from rotation or lateral displacement by the arm 15, and when assembling said coupling it is but necessary to slip the eye 18 down past said arm to rest in vertical position on the hook-shank 16, thus producing a coupling capable of hinging movements to permit adjustment of the harvester either vertically or horizontally. As indicated, axle 17 is non-rotatable, and the engagement of eye 18 with arm 15, as shown in Fig. 2, is such as to prevent any appreciable rocking of such axle or support, but permits the positively vertical and horizontal hinging effects stated; and when it is desired to vertically adjust the harvester to the height of grain to be cut (by common and well known means) such adjustment is permitted by the pivotal mounting of the arm 11 and brace 11' through the loose collars 5' and 6' on shaft 17. When my improved combined harvester-thrasher is thus assembled, and the brace-rod 9 connected to the thrasher and harvester substantially as indicated in Fig. 1, said elements become substantially secured in a hinged or flexible manner, so that during the cutting and traveling operation in the field the harvester may freely follow ground undulations without straining its connections, and when it is desired to transport the combined machine over roads, bridges and the like the width thereof may be materially reduced for the purpose, which is accomplished by removing brace-rod 9 and then simply swinging the harvester horizontally alongside the thrasher in substantially the position indicated by dotted lines in Fig. 1, so that the entire machine including the balancing mechanism will be assembled in folded condition in a compact and expeditious manner. As indicated, my simple coupling may be readily secured to the machine elements at a point where it will be effective to permit the variable movements of the harvester in relation to the thrasher as the machine moves through the field, and at the same time, by the simple adjustment described, be readily positioned alongside the thrasher for transportation purposes. When the harvester is being so adjusted alongside the thrasher it is unnecessary to remove the counterbalancing structure, which is commonly done, as the brace 11', being connected in diagonal relation to the harvester, freely passes beyond the rear of the thrasher so that the arm 11 and its weight become transversely positioned at the rear thereof, by which arrangement the labor of dismantling and reassembling the counterbalancing parts when folding and undfolding the harvester is eliminated, and by maintaining the harvester and counterbalance intact the harvester is sustained during its horizontal movements but which would otherwise fall to the ground unless supported by other means.

I claim as my invention:

1. In a machine of the class described, a thrasher, a harvester, a support for the harvester, a weighted counterbalancing arm connected to the harvester and its support, a brace connecting said harvester and said arm, and means connecting the harvester support and thrasher for folding the harvester alongside the thrasher and incidentally positioning said weighted arm in transverse relation to the rear of the thrasher.

2. A coupling for a combined harvester and thrasher, comprising an open-sided hook attached to the thrasher and having its arm extending upwardly at right angles to its shank, and an eye attached to the harvester and connected at right angles to the shank of said hook, said hook and eye constituting a coupling for the thrasher and harvester whereby the latter may be folded alongside the thrasher and oscillate as said harvester is traversing ground irregularities.

3. A coupling for a combined harvester and thrasher, comprising a hook embodying a shank, an arm extending upwardly at right angles from the shank, a coupling member comprising a vertically arranged eye detachably connected to said hook and prevented from displacement therefrom by said arm, whereby when said hook and eye are connected to each other and attached to a harvester and a thrasher the harvester may oscillate vertically and also be folded in relation to the thrasher.

4. A coupling for a combined harvester and thrasher, comprising a shank, a horizontal arm extending at right angles from the shank and terminating in a vertically extending member, and a coupling member hingedly connected to said arm, whereby the harvester may oscillate vertically and also be folded alongside the thrasher.

In testimony whereof I affix my signature.

NORMAN R. KRAUSE.